Patented Nov. 15, 1938

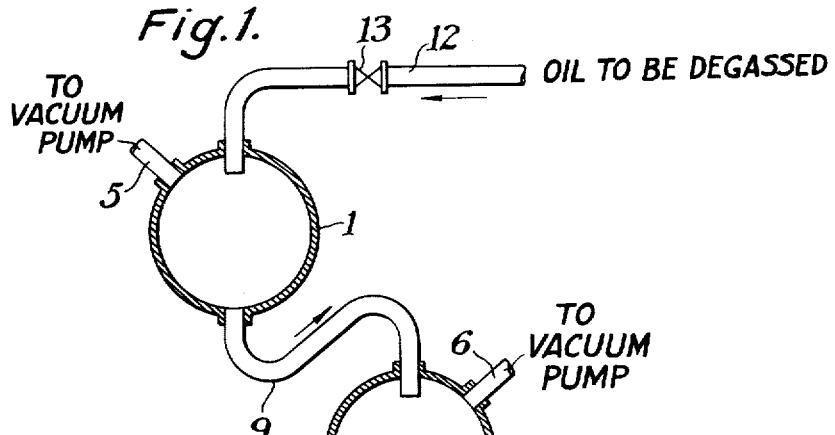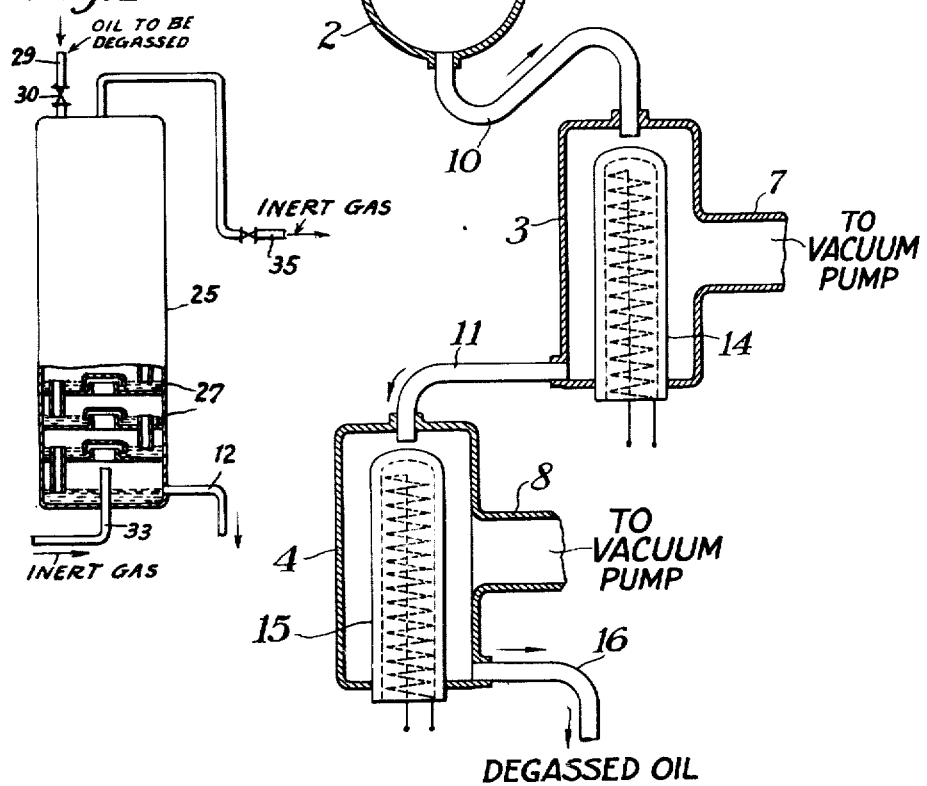

2,136,774

UNITED STATES PATENT OFFICE 2,136,774

TREATMENT OF OILS

Kenneth C. D. Hickman, Rochester, N. Y., assignor, by mesne assignments, to Distillation Products, Inc., Rochester, N. Y., a corporation of Delaware Application November 7, 1935, Serial No. 48,691

4 Claims. (Cl. 202—56)

This invention relates to the purification and partial distillation of natural organic products, such as vegetable and animal fats, oils, waxes and the like, and, more particularly, to the removal from such products of certain constituents giving rise to undesirable taste and odors.

Oils, fats and the like substance of plant and animal origin consist primarily of glycerides and fatty acids mixed with absorbed air, oxygen, oxidation products and unstable peroxides, which latter materials, due to their reaction with various constituents in the oils, are responsible for rancidity and undesirable taste and odor. As is well known, fish oils have highly characteristic odor and taste and it is believed that the peroxides and oxidation products are responsible for these undesirable characteristics. Absorbed gases, especially oxygen, are believed to destroy vitamin content in the oils, such as vitamins A, D and/or E. A satisfactory removal of odors and an improvement in taste and keeping qualities, especially of vitamin rich animal oils is of considerable importance. Oils for human consumption should preferably be tasteless and odorless, while those used for various other purposes, such as, for instance, manufacture of soap, should preferably be practically free of odor.

The problem of removing undesirable odors and tastes of edible and medicinal oils and fats has existed for a considerable period of time and various attempts looking toward the solution of the problem have been made, but until the advent of the invention to be described hereinafter, none of such methods have achieved complete or commercial success and they have often involved procedures which adversely affected therapeutic value and other characteristics of the materials dealt with. For example, it has been proposed in British Patents Nos. 382,060 and 385,774 to remove odors and tastes from cod liver oil by hydrogenation in the presence of a metal catalyst at high temperatures and pressures. This is a relatively expensive procedure and one which entails a partial loss of vitamins. Rosenstein and Hund in the U. S. Patent No. 185,859 have attempted the removal of fatty acids by extraction with toxic alkylol amine solvents and their mixtures. More recently, a vacuum distillation method has been applied to the purification and concentration of the vitamin content of fish oils and other oils of animal and fish origin, but while this does result in a very considerable improvement in the odor and taste of such material, by the pretreatment of the oils to be distilled in accordance with the present invention, the products from such a distillation and the process of distillation itself can be considerably improved.

The present invention has for its object to overcome the deficiencies of hitherto known purification processing for the treatment of natural oils such as animal and vegetable oils, fats, waxes, concentrates thereof and the like, and to provide a process whereby such materials may be purified and improved in taste and odor without adversely affecting their medicinal and therapeutic value. A further object is to provide a process for the purification of the oils and fatty bodies by a process which avoids heating the materials to any considerable extent or subjecting them to drastic chemical action. A still further object is to provide a process for improving the taste and odor of fish oils. Another object is to provide a process for the purification of such materials whereby those constituents giving rise to undesirable taste and odor may be removed partially or substantially completely and without deleterious contamination of the completed material and without destroying the vitamin content thereof. A further object is to provide an improvement in molecular distillation processes whereby degassing and removal of absorbed gases from oils to be distilled is rendered easily possible without great waste of heat energy and elaborate distillation equipment. A specific object is to provide a process for the purification and incipient distillation of fish oils, such as cod liver, halibut liver, concentrates thereof and the like, and to provide a highly refined oil of satisfactory taste, odor and purity. Other objects will appear hereinafter.

These objects are accomplished by the following invention which comprises subjecting the oils to a vacuum to degas them or by introducing an inert gas into the oil to displace absorbed gases and then subjecting the oil to vacuum treatment. Both methods affect the removal of the undesirable constituents and absorbed gases, such as oxygen, peroxides and odoriferous materials. By this invention oils which are completely degassed and deodorized may be immediately subjected to high vacuum or molecular distillation to yield an improved distillation product.

In the following examples and description I have set forth several of the preferred embodiments of my invention but it is to be understood that they are included merely for purposes of illustration and not as a limitation thereof.

In carrying out my invention, the material to be treated is subjected to degassing in a vacuum. I have found that oils absorb a considerable volume of gases in handling and on exposure to the air and that subjecting them to a high vacuum, especially while in the form of a thin film, will effectively remove such absorbed materials, and at the same time remove odoriferous materials present in the oil. An improved removal of such substances results from heating oils while they are undergoing the low pressure treatment. The degassing treatment may be immediately followed by molecular distillation to separate vitamins or other therapeutic values from the oil, in which case reheating of the oil is unnecessary and the burden upon vacuum pumps used in producing and maintaining the vacuum during distillation is considerably lessened due to the fact that a major portion of permanent gas has been removed.

Merely subjecting the oil to gradually decreasing pressures in a single chamber will effectively produce the desired results. However, as the quantity of gas dissolved in an oil at atmospheric pressure will increase enormously in volume in accordance with Boyle's law when it is liberated under high vacuum, the expansion of the dissolved gases in a single stage presents considerable pumping difficulties. It is, therefore, preferred to pass the oil to be treated through multi-chambered degassing apparatus in which each successive chamber has a lower pressure than the previous chamber where the oil has been treated. The gases will thus be removed in portions in each chamber, the larger proportions at a relatively higher pressure and consequently smaller bulk, thus materially saving the amount of pumping equipment and energy otherwise necessary in the single stage operation.

A preferred method of carrying out the invention involves introduction in to the oil of an inert gas or the vapors of an inert volatile substance prior to the vacuum treatment. This method of operation is especially preferable when an oil containing a perishable constituent, such as a vitamin, is to be treated. It is well known that if an oil containing a vitamin is heated without pretreatment to elevated temperatures the vitamin is temporarily or partially destroyed. The destruction is probably the result of a reaction between oxygen, unstable peroxides and water, etc., with the perishable material contained in the oil. The method of degassing with an inert gas affords an easy method for removal of the absorbed gases without the use of excessively elevated temperatures. Furthermore, as the method involving the use of inert gas can be applied to multi-stage degassing equipment, the temperatures in the later stages may be considerably above those at which the vitamin would be destroyed under atmospheric conditions because most of the absorbed destructive reactants had been removed in the earlier higher pressure stages.

The inert gas is introduced into the oil with a view to sweeping out the undesired absorbed gases and the most volatile of the odoriferous materials and partially replacing them by the non-reactive inert gas used. The oil may be treated in the cold with the inert gas or vapor which will displace the air and water. Alternatively, the cold oil and inert gas or vapor may be contacted in counter-current streams so that the stream of inert gas carries with it the absorbed undesirable gases and the oil containing the inert gas is separated and subjected to vacuum treatment.

It is also possible and in some cases desirable, especially where a hot oil is to be used subsequently, such as in processes of molecular distillation, to supply the inert gas in a heated condition so that the oil emerges from the counter-current treatment somewhat heated while the inert gas emerges cold, the warm oil passing on for distillation having substantially the temperature of the warm inert gas introduced.

As indicated, any inert gas or inert vapor of an easily volatile substance can be used. Nitrogen, argon, helium, or other rare gases, and hydrogen are examples of inert gases which have been found to give excellent results. Since the pumping rate under high vacuum is inversely proportional to the square root of the molecular weight of the residual gas, it is preferable to use an inert gas of low molecular weight, such as hydrogen or helium. Thus, having the materials saturated with hydrogen or helium instead of nitrogen will increase the pumping speed nearly four times, in the subsequent degassing and distillation steps. This is of especial importance in the molecular distillation process because the lowering of the pressure to within the distillation range is usually effected with great difficulty. There is still another added advantage in using hydrogen. The residual hydrogen contained in the oil can be materially reduced by passing the oil at ordinary or elevated temperature and pressure over a hydrogenation catalyst, hydrogen being added to the unsaturated glycerides contained in the oil. The amount of residual hydrogen to be removed by the vacuum pumps would therefore be considerably reduced. The conditions for such hydrogenation would be obvious to one skilled in the art, and would generally vary from room temperature to 300° C. and pressures of 1–200 atmospheres. Any well-known hydrogenation catalyst can, of course, be used, such as, for instance, nickel, platinum, palladium, etc.

When vapors of easily volatile substances, such as acetone, ether, methyl chloride or carbon dioxide are used as the inert gaseous or vapor material, the warm oil to be degassed may be passed counter-current to such vapors and then withdrawn into the evacuating system. By another variation, it is possible to mix the oil with the volatile substance in liquid form and then to subject it at atmospheric pressure and without contact with air, to a gradually rising temperature as it flows toward the vacuum chamber in a thin layer. If necessary the elimination by heat of added volatile material may be assisted by a stream of nitrogen. The evacuating system should preferably have between the vacuum chamber and the pump, a trap cooled to a temperature appropriate for the degassing vapor so that the latter is condensed almost entirely and no extra burden is put on the pumping equipment. Thus a temperature suitable for removing the bulk of the acetone or ether may be obtained by the use of solid carbon dioxide. A lower temperature to remove methyl chloride may be obtained by carbon dioxide evaporated under reduced pressure. A temperature sufficiently low to remove carbon dioxide may be secured by liquid air.

The pressures to be used in the evacuating system vary greatly and depend on the particular type of oil to be treated, its degree of purity and the degree of purification desired. Pressures as high as 5 mm. remove a large proportion of the gases and the most volatile of the nascent materials, especially at elevated temperatures. On the other hand, there is no lower pressure limit since the higher the degree of vacuum the more complete is the removal of adsorbed gases and odoriferous materials. The degree of vacuum to be used also depends on the temperature at which the oil is to be heated during the degassing step, elevated temperatures aiding materially in affecting the removal of the less volatile odoriferous materials. Since the oils contain material amounts of gases and vapors which occupy huge volumes at low pressures it is obvious that as these gases are given off under vacuum conditions the pressure is somewhat gradually lowered. It has been found that while all pressures up to 5 mm. give degassing the lower portion of this range is preferable especially where a crude oil is to be deodorized or a high rate of and complete degassing is desired. The final pressure should in such a case be lowered to between about .001 and 1 mm. and preferably between about .1 mm. and .001 mm. since these lower pressures enable a more complete removal of products of rancidity and undesired materials of similar volatility. Where the oil is to be immediately run into a molecular distillation zone the pressure of the last stage of the degasser should preferably correspond rather closely to the pressure to be used in the molecular still, i. e., less than .1 mm. and preferably less than .01 mm.

The temperatures during degassing should be kept below that at which decomposition of the constituents of the oil takes place, and below that at which the oil itself distills. The temperature used obviously depends upon the pressure employed and with pressures near the higher pressure limits set forth above high temperatures are necessary to drive off the less volatile of the odoriferous materials. With the lower pressure range very high temperatures are unnecessary. Temperatures up to about 250° C. may be used, but in each particular case account must be taken of the above factors, lower temperatures such as 50° to 150° are usually found to be satisfactory in degassing and removing odoriferous materials from fish and other animal oils. Where vitamin containing oils are to be treated the temperature should be obviously kept below that at which the vitamin constituents decompose. However, as set forth above the temperature in the final stage of high vacuum may be higher than that in the lower pressure stage since destructive gases have been removed.

As indicated, the degassed oil can be directly conducted to the distillation zone and subjected to molecular distillation under low vacuum conditions, such as set forth and described in my U. S. Patents Nos. 1,942,858 and 1,925,559, the conditions of molecular distillation being generally less than .1 mm. pressure and preferably less than 0.1 mm. at temperatures between about 70° and 250° C.

In the accompanying drawing I have illustrated in diagrammatic form, suitable apparatus for carrying out the degassing process in accordance with my invention wherein:

Fig. 1 is a section in elevation of the vacuum treating apparatus for degassing and/or deodorizing the oils, and Fig. 2 is an elevation partly in section of suitable gas and liquid contact apparatus for carrying out inert gas treatment prior to degassing.

Referring to Fig. 1 numerals 1, 2, 3, and 4 designate vacuum chambers provided with evacuation conduits 5, 6, 7 and 8 respectively. The chambers are connected in series as shown by conduits 9, 10 and 11. Chamber 1 is connected to a conduit 12 provided with valve 13 through which oil to be degassed is introduced into the system. Chambers 3 and 4 are provided with internal cylindrical dome-shaped elements 14 and 15 which are electrically heated as shown. Degassed oil is withdrawn through conduit 16 and led to a high vacuum or molecular still or to storage.

In operation the vacuum chambers are evacuated and oil to be degassed is allowed to flow through conduit 12 in a steady stream. On flowing into chamber 1 the oil bursts into droplets, due to the low pressure, and gas is continuously removed through conduit 5. The oil then flows through conduit 9 into chamber 2 maintained at a still lower pressure where a similar action takes place. The oil then flows into chamber 14 and falls onto the heated element 14 flowing down the walls in a thin film from which absorbed gas is removed. The oil then flows into chamber 4 where substantially all residual absorbed gas is removed. Since a large volume of gas is released in chambers 1 and 2 it is desirable to provide them with high capacity pumps. In order to permit chambers 1 and 2 to be maintained at independent pressures conduits 9 and 10 are shaped to form a liquid seal between them. The pressure is so low in chambers 3 and 4 that resistance to gas flow is great and no such seals are therefore necessary.

Referring to Fig. 2 numeral 25 designates a closed cylindrical chamber in which are disposed a plurality of bubble plates 27 as in conventional gas and liquid contact apparatus. Numeral 29 designates a conduit provided with valve 31 through which oil to be washed with gas is introduced into chamber 25 and onto the top plate 27. Numeral 33 designates a conduit through which inert gas is introduced into the base of chamber 25. The gas passes upwards through the oil disposed on the plates 27 and is finally removed through conduit 35 provided with valve 37. The oil passes to the bottom and is removed through conduit 12. This oil, the contained gases, of which have been replaced by inert gases, is then led into chamber 1 of Fig. 1.

It is apparent that conventional liquid-gas contact apparatus other than that illustrated in Fig. 2 can be employed if desired. For instance, instead of plates 27 it may be preferable to fill the chamber 25 with porcelain rings such as is usually employed in fractionating columns.

Normally the removal of absorbed gases in molecular distillation processes have presented a considerable problem and necessitated elaborate apparatus. By degassing the oils to be distilled with an inert gas in accordance with my invention most of the volatiles and gases will have been removed and a degassed oil at any desired temperature and pressure may be admitted to the distillation zone. Also as pointed out above, the inert gas aids in an effective removal of absorbed gases and vapors which would not be possible if the oils were directly subjected to molecular distillation. Furthermore, any inert low molecular weight gas still present in the oil when introduced into the distillation zone can be more easily removed than gases, such as air, which would otherwise be present.

Where, however, the materials are not to be subsequently distilled, they may be removed from the degasser in a substantially odorless condition and used where substantially odorless oil has been found to be necessary. Thus, where animal or vegetable oils containing therapeutic values, such as vitamins A, D, and/or E, are to be treated to improve their edible qualities, the purified oils coming from the degasser may be immediately bottled preferably under vacuum or with an inert gas and stored without subsequent development of rancidity.

The process is applicable to the treatment of all natural oils and especially oils containing constituents of therapeutic value, such as fish and vegetable oils and concentrates thereof. Examples of such oils are cod, salmon, halibut, and tuna fish liver oils, mackerel, sardine, menhaden, dogfish, etc. body oils and vegetable oils such as linseed, wheat germ, etc. oils. These materials are listed for purposes of illustration only, and it is obvious that the process is applicable to the deodorization and degassing of any natural oil such as vegetable or animal oils or concentrates thereof. The purification described is especially suitable for the purification and deodorization of vitamin concentrates obtained from fish oils. These materials are particularly sensitive to oxidation and their keeping qualities and taste are greatly improved by the treatment of the present invention. In cases where the oils treated contain vitamins, it is often desirable to seal them under the vacuum used in degassing as it assures permanent freedom from oxidation, rancidity and material loss in vitamin potency.

The herein described invention constitutes a simple, economical and effective solution of the problem of deodorizing and improving the taste of natural oils particularly fish oils which in the natural condition are especially offensive from the standpoint of odor and taste. By means of the present invention a substantially odorless completely degassed oil may be immediately subjected to molecular distillation thus avoiding the prolonged and expensive methods of preparing the oil for molecular distillation which have heretofore been used. An outstanding advantage of the herein described process is the removal of destructive agents from a vitamin containing oil, prior to a heating step such as in distillation, which would otherwise result in at least a partial loss of the vitamin.

While in the description and claims, I have referred to the materials removed as gases and to the process as degassing, it is apparent that these terms are not intended to merely designate the removal of normally gaseous materials from the oil but are intended to indicate the removal of such gases and also vapors of materials in the oil which are vaporized during the degassing treatment.

What I claim is:

1. In the process of molecular distillation the preliminary steps of treating the material prior to distillation which comprise introducing an inert gas or inert vapor of an easily volatilizable material into a natural glyceride oil at a temperature sufficiently low that the inert gas or vapor does not react with the oil in order to displace absorbed air and volatile materials and then subjecting said treated oil while in the form of a thin film to a vacuum of less than .1 mm. to remove the residual gases and odoriferous materials contained therein.

2. In a process of molecular distillation the preliminary steps of treating the material prior to distillation which comprise introducing an inert gas or inert vapor of an easily volatilizable material into a glyceride animal oil at a temperature sufficiently low that the inert gas or vapor does not react with the oil in order to displace absorbed air and volatile materials and then subjecting said treated oil while in the form of a thin film to a pressure of less than .1 mm. to remove the residual gases contained therein.

3. In a process of molecular distillation the preliminary steps of treating the material prior to distillation which comprise introducing an inert gas of low molecular weight into a glyceride oil containing a fat soluble vitamin at a temperature sufficiently low that the inert gas does not react with the oil to displace absorbed air and volatile materials and then subjecting the said treated oil in the form of a thin layer to a pressure of less than .1 mm. to remove the residual gases and odoriferous materials contained therein.

4. In a process of molecular distillation the preliminary steps of treating the material prior to distillation which comprise passing an inert gas or inert vapor of an easily vaporizable material through the organic oil at approximately room temperature in order to displace absorbed gases and then subjecting said treated oil while in the form of a thin film to a pressure of less than about .1 mm. to remove residual gases therefrom.

KENNETH C. D. HICKMAN.

---

CERTIFICATE OF CORRECTION.

Patent No. 2,136,774.  November 15, 1938.

KENNETH C. D. HICKMAN.

It is hereby certified that error appears in the printed specification of the above numbered patent requiring correction as follows: Page 3, first column, line 60, for "0.1" read .01; and that the said Letters Patent should be read with this correction therein that the same may conform to the record of the case in the Patent Office.

Signed and sealed this 7th day of February, A. D. 1939.

Henry Van Arsdale.

(Seal)  Acting Commissioner of Patents.

vegetable oils containing therapeutic values, such as vitamins A, D, and/or E, are to be treated to improve their edible qualities, the purified oils coming from the degasser may be immediately bottled preferably under vacuum or with an inert gas and stored without subsequent development of rancidity.

The process is applicable to the treatment of all natural oils and especially oils containing constituents of therapeutic value, such as fish and vegetable oils and concentrates thereof. Examples of such oils are cod, salmon, halibut, and tuna fish liver oils, mackerel, sardine, menhaden, dogfish, etc. body oils and vegetable oils such as linseed, wheat germ, etc. oils. These materials are listed for purposes of illustration only, and it is obvious that the process is applicable to the deodorization and degassing of any natural oil such as vegetable or animal oils or concentrates thereof. The purification described is especially suitable for the purification and deodorization of vitamin concentrates obtained from fish oils. These materials are particularly sensitive to oxidation and their keeping qualities and taste are greatly improved by the treatment of the present invention. In cases where the oils treated contain vitamins, it is often desirable to seal them under the vacuum used in degassing as it assures permanent freedom from oxidation, rancidity and material loss in vitamin potency.

The herein described invention constitutes a simple, economical and effective solution of the problem of deodorizing and improving the taste of natural oils particularly fish oils which in the natural condition are especially offensive from the standpoint of odor and taste. By means of the present invention a substantially odorless completely degassed oil may be immediately subjected to molecular distillation thus avoiding the prolonged and expensive methods of preparing the oil for molecular distillation which have heretofore been used. An outstanding advantage of the herein described process is the removal of destructive agents from a vitamin containing oil, prior to a heating step such as in distillation, which would otherwise result in at least a partial loss of the vitamin.

While in the description and claims, I have referred to the materials removed as gases and to the process as degassing, it is apparent that these terms are not intended to merely designate the removal of normally gaseous materials from the oil but are intended to indicate the removal of such gases and also vapors of materials in the oil which are vaporized during the degassing treatment.

What I claim is:

1. In the process of molecular distillation the preliminary steps of treating the material prior to distillation which comprise introducing an inert gas or inert vapor of an easily volatilizable material into a natural glyceride oil at a temperature sufficiently low that the inert gas or vapor does not react with the oil in order to displace absorbed air and volatile materials and then subjecting said treated oil while in the form of a thin film to a vacuum of less than .1 mm. to remove the residual gases and odoriferous materials contained therein.

2. In a process of molecular distillation the preliminary steps of treating the material prior to distillation which comprise introducing an inert gas or inert vapor of an easily volatilizable material into a glyceride animal oil at a temperature sufficiently low that the inert gas or vapor does not react with the oil in order to displace absorbed air and volatile materials and then subjecting said treated oil while in the form of a thin film to a pressure of less than .1 mm. to remove the residual gases contained therein.

3. In a process of molecular distillation the preliminary steps of treating the material prior to distillation which comprise introducing an inert gas of low molecular weight into a glyceride oil containing a fat soluble vitamin at a temperature sufficiently low that the inert gas does not react with the oil to displace absorbed air and volatile materials and then subjecting the said treated oil in the form of a thin layer to a pressure of less than .1 mm. to remove the residual gases and odoriferous materials contained therein.

4. In a process of molecular distillation the preliminary steps of treating the material prior to distillation which comprise passing an inert gas or inert vapor of an easily vaporizable material through the organic oil at approximately room temperature in order to displace absorbed gases and then subjecting said treated oil while in the form of a thin film to a pressure of less than about .1 mm. to remove residual gases therefrom.

KENNETH C. D. HICKMAN.

---

CERTIFICATE OF CORRECTION.

Patent No. 2,136,774.  November 15, 1938.

KENNETH C. D. HICKMAN.

It is hereby certified that error appears in the printed specification of the above numbered patent requiring correction as follows: Page 3, first column, line 60, for "0.1" read .01; and that the said Letters Patent should be read with this correction therein that the same may conform to the record of the case in the Patent Office.

Signed and sealed this 7th day of February, A. D. 1939.

Henry Van Arsdale.

(Seal)  Acting Commissioner of Patents.